C. E. BAKER & E. M. DE LONG.
TAKE-UP FOR FLEXIBLE CONNECTIONS.
APPLICATION FILED JULY 8, 1910.
1,126,176.
Patented Jan. 26, 1915.
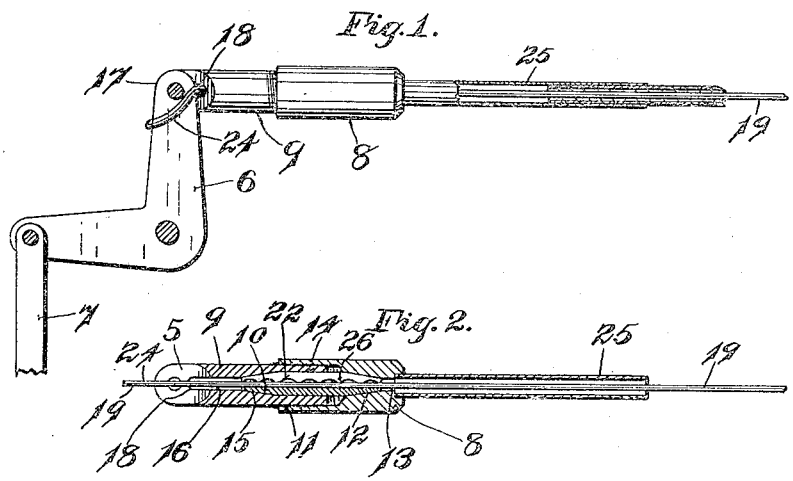
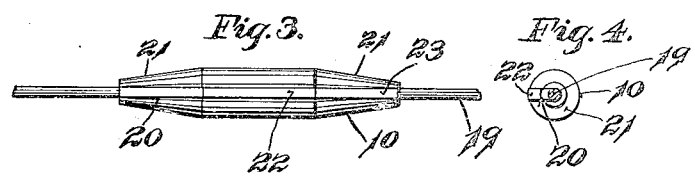
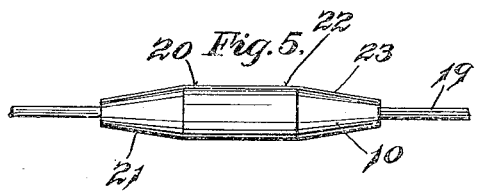
WITNESSES:
INVENTOR.
Charles E. Baker
Everett M. de Long.
BY
Arthur B. Jenkins
ATTORNEY.

UNITED STATES PATENT OFFICE.

CHARLES E. BAKER AND EVERETT M. DE LONG, OF HARTFORD, CONNECTICUT, ASSIGNORS, BY MESNE ASSIGNMENTS, TO THE NEW BRITAIN MACHINE COMPANY, OF NEW BRITAIN, CONNECTICUT, A CORPORATION OF CONNECTICUT.

TAKE-UP FOR FLEXIBLE CONNECTIONS.

1,126,176.  Specification of Letters Patent.  Patented Jan. 26, 1915.

Application filed July 8, 1910. Serial No. 570,952.

*To all whom it may concern:*

Be it known that we, CHARLES E. BAKER and EVERETT M. DE LONG, citizens of the United States, and residents of Hartford, in the county of Hartford and State of Connecticut, have invented a new Improvement in Take-Ups for Flexible Connections, of which the following is a specification.

Our invention relates to the class of devices by means of which the length of a flexible connection may be varied, and the object of the invention among others is to provide a device of this class that may be readily and conveniently operated and by means of which the parts will be firmly and securely held. This and other objects will present themselves from an examination of the device shown in the accompanying drawings illustrating one form of embodiment of our invention, in which—

Figure 1 is a view illustrating the manner of use of our improved takeup device. Fig. 2 is a detail view in central longitudinal section through the device, the tubular section of the cord shown in Fig. 1 being omitted. Fig. 3 is a detail view of the clamp holder. Fig. 4 is an end view of the same. Fig. 5 is a detail view of the clamp or wedge holder showing the relative position of the parts.

While our invention is adapted for use with various forms of flexible connection, it is especially applicable to flexible connections embodied in the actuating mechanism of motor vehicles, and especially motorcycles, and such a connection is therefore shown and described herein for the purpose of disclosure of the invention.

In the accompanying drawings the numeral 6 denotes a bell-crank lever to one arm of which a connecting rod 7 is attached, which rod may extend to the device to be actuated, as a brake, valve or the like. A sectional clamp case composed of an outer section 8 and an inner section 9 incloses a clamp or wedge holder 10. The outer section has a threaded mouth 11 with which the threaded end of the inner section engages, a tapered clamping surface 12 extending from the mouth inward and an opening 13 leading from the tapered clamping surface to the end of the section, the mouth, tapered surface and opening extending entirely through the section.

The inner section of the casing has a cylindrical opening 14 with a tapered clamping surface 15. The end of the inner section of the casing is cut away on opposite sides forming a flat portion 5 that engages within the fork 17 at the end of one of the arms of the bell-crank lever. A hole 18 extends from the opening 14 to the outer surface of the case, through which hole a flexible connection 19 extends, this being one end of the connection which extends through the clamp to a handle or actuating lever for operating the parts, which handle or actuating lever is not shown herein as not being essential to a thorough understanding of the invention. The mouth 11 and the opening 14 constitute a chamber within the casing that incloses the clamp or wedge holder.

The wedge or clamp holder 10 has a slot 20 formed longitudinally therein and of a depth extending substantially to the center of the holder, the bottom of which is for the reception of the flexible connection 19. In the preferred form of construction and as shown herein this slot is of a width substantially equal to the diameter of the connection, but this is not absolutely essential, as the cord may be of any suitable size with respect to the width of the slot. The holder at its central longitudinal part is preferably of cylindrical form with tapered surfaces 21 extending from each end of the cylindrical portion to the adjacent end of the holder.

A clamp 22 is located within the slot 20, this clamp as to its outer edge preferably conforming in shape to the outer surface of the holder and including tapered surfaces 23. This clamp will be of such width that when placed in the slot and resting upon the flexible connection it will project slightly beyond the outer surface of the holder. The tapered surfaces 21 and 23 on the holder and clamp respectively conform to the beveled clamp surfaces 12 and 15 within the sections of the casing, and it will be noted from the construction that by giving relative turning movement to one of the case sections in a direction to draw them together the tapered surfaces 12 and 15 wedging against the tapered surfaces 21 and 23 will drive the wedge firmly to its seat against the connection, thus firmly securing the latter in place.

It will be found of advantage to form the bottom edge of the clamp with an irregular surface 26 as shown in Fig. 2, this imparting added gripping power to the clamp.

When it is desired to take up the flexible connection a slight turning movement of one case section with respect to the other will loosen the wedge when the end 24 of the cord may be grasped and the cord drawn to the required extent through the takeup, and then by turning the case sections in the opposite direction the cord is quickly and securely tightened and held in place.

As this device finds ready use in connection with a cord of common construction which consists of a flexible, tubular section within which the main cord is located, we provide a sleeve 25 extending from the casing within which the tubular section of the cord will project, so that as the takeup device is moved in the longitudinal movement of the inner section of the cord this will not result in an opening between the outer section of the cord and the takeup device, as the outer section of the cord will always remain within said sleeve.

Our invention may be embodied in constructions differing from that shown herein, and we do not therefore limit our invention to a device constructed in exact accordance with that herein shown and described.

We claim—

1. A takeup casing including two members, one fitting and secured within the other, said casing having a chamber tapered at each end and having a hole opening from each end of the chamber to each end of the casing, a holder located within the casing and having its ends tapered and having a slot extending therethrough, and a clamp in said slot extending from end to end of the holder and having tapered surfaces conforming in degree of obliquity and length to the tapered surfaces on the walls of the casing.

2. A takeup casing having a chamber therein, and a clamping device located within said chamber and arranged to clamp a member therein, the end of the casing as to its outer surface being cut-away on one side thereof to a depth to intersect a line extending lengthwise of the casing through said chamber, said casing having a hole extending lengthwise of the casing from the chamber and opening into said cut-away portion.

3. A takeup casing having a chamber therein, a clamping device located within said chamber and including a member having a lengthwise groove, and a clamping member located within the groove, said casing being cutaway as to its outer surface on one side at the end thereof to a depth to intersect a line extending lengthwise of the casing through said chamber, said casing also having a hole extending lengthwise of the casing from said chamber and opening into said cutaway portion.

4. A takeup casing having a hole extending lengthwise therethrough, said hole being enlarged to form a clamping chamber within the casing, a clamping device within said chamber for clamping a member extending through said chamber, the end of the casing being cutaway as to its outer surface at one end on the side thereof to a depth to intersect a line extending lengthwise through said hole and chamber.

CHARLES E. BAKER.
EVERETT M. DE LONG.

Witnesses:
LENA E. BERKOVITCH,
G. B. LYNCH.

Copies of this patent may be obtained for five cents each, by addressing the "Commissioner of Patents, Washington, D. C."